(12) United States Patent
Lemberg et al.

(10) Patent No.: US 8,581,541 B2
(45) Date of Patent: Nov. 12, 2013

(54) MOTOR DRIVE WITH CONFIGURABLE SIGNAL CONDITIONING APPARATUS AND METHOD

(75) Inventors: Nicholas Lemberg, Milwaukee, WI (US); Jeremiah Kopiness, Saukville, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 65 days.

(21) Appl. No.: 13/412,949

(22) Filed: Mar. 6, 2012

(65) Prior Publication Data
US 2013/0234783 A1 Sep. 12, 2013

(51) Int. Cl.
*H02P 27/06* (2006.01)
*H02H 7/08* (2006.01)

(52) U.S. Cl.
USPC .............. 318/798; 318/800; 318/434; 361/23

(58) Field of Classification Search
USPC ............ 318/778, 779, 798, 800, 434; 361/23, 361/24, 31
See application file for complete search history.

(56) References Cited

U.S. PATENT DOCUMENTS

| | | | |
|---|---|---|---|
| 5,206,572 A * | 4/1993 | Farag et al. .................. | 318/778 |
| 5,386,183 A * | 1/1995 | Cronvich et al. ............. | 318/434 |
| 5,729,113 A * | 3/1998 | Jansen et al. ................. | 318/799 |
| 8,208,276 B2 * | 6/2012 | Sato et al. .................... | 363/131 |
| 2004/0027089 A1 * | 2/2004 | Forsey .......................... | 318/685 |
| 2004/0223346 A1 * | 11/2004 | Rayner et al. ................. | 363/37 |
| 2009/0168472 A1 * | 7/2009 | Chung et al. .................. | 363/65 |
| 2009/0242751 A1 * | 10/2009 | Gabeler ........................ | 250/282 |
| 2010/0164455 A1 * | 7/2010 | Li et al. ........................ | 323/283 |
| 2011/0051478 A1 * | 3/2011 | Sato et al. .................... | 363/123 |

* cited by examiner

*Primary Examiner* — Eduardo Colon Santana
(74) *Attorney, Agent, or Firm* — Fay Sharpe LLP; Alexander Kuszewski; John M. Miller (57) ABSTRACT

Motor drives, signal conditioning systems and configurable circuit boards are presented in which diode blocking circuits are provided for contemporaneous opening of programming fuses in multiple programmable impedance circuits using a single configuration input signal during manufacturing and for mitigating interference between impedance circuits during system operation.

20 Claims, 6 Drawing Sheets

MOTOR DRIVE WITH CONFIGURABLE SIGNAL CONDITIONING APPARATUS AND METHOD

BACKGROUND

Programmable or configurable impedance circuits are used in motor drives and other power conversion systems for a variety of purposes, including scaling and signal conditioning for feedback sensor signals such as input and/or output current sensors, intermediate DC link voltage sensors and the like. Power conversion product lines typically include multiple models having different voltage and/or current ratings. Thus, sensor signal levels may vary from one product to the next, requiring signal conditioning circuitry tailored for each individual product. However, providing specialized signal conditioning circuitry for each product is costly in terms of low component volume for each individual circuit board design and also in terms of the costs associated with maintaining inventory for a variety of different circuit board configurations. Configurable impedance circuits can be used in a given circuit board design, but programming these during manufacturing can be expensive in terms of personnel time and fixturing expense, particularly where a large number of programming signals must be applied to each board during manufacturing. Accordingly, there is a need for improved apparatus and techniques by which feedback signal conditioning and other programmable impedance circuits can be configured to accommodate use in a variety of different products and/or applications.

SUMMARY

Various aspects of the present invention are now summarized to facilitate a basic understanding of the invention, wherein this summary is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter.

The present disclosure involves configurable motor drive signal conditioning circuitry and programmable impedance circuits generally, in which configuration inputs are shared among two or more signal channels using blocking circuitry that allows concurrent opening of programming fuses using a small number of configuration inputs, while mitigating interference between channel circuits during operation of the final product. In certain embodiments, blocking circuitry provides diode augmentation to allow the number of configurable circuits to increase without increasing the number of inputs to the configuration circuitry, and without adding significant component cost to the manufactured circuit board, while allowing reduction and manufacturing cost by conserving the number of configuration inputs used in reducing programming time.

In accordance with one or more aspects of the present disclosure, a configurable circuit board is provided, which includes multiple programmable impedance circuits individually including multiple parallel circuit branches connected between first and second circuit nodes. Each circuit branch includes one or more impedances, such as resistance, capacitance, inductance or combinations thereof, coupled with the first circuit node as well as one or more fuses connected between the impedance and the second circuit node. A blocking circuit is provided between a plurality of configuration inputs and the programmable impedance circuits to facilitate contemporaneous opening of fuses of a given circuit branch of each of the programmable impedance circuits using a single configuration input signal, while preventing electrical interaction between the programmable impedance circuits when the configuration signal source is disconnected from the circuit board.

In certain embodiments, the blocking circuit includes groups of diodes, with each diode group corresponding to one of the configuration inputs and each group having diodes individually corresponding to one of the circuit branches. In these embodiments, providing a single configuration input signal concurrently opens fuses of corresponding circuit branches in multiple programmable impedance circuits.

In other embodiments, the blocking circuit includes multiple diode groups, each corresponding with two or more branches of each of the programmable impedance circuits, and each corresponding with one of the configuration inputs. In these embodiments, each diode group includes, for each of the programmable impedance circuits, first and second diodes individually including an anode coupled with the corresponding configuration input as well as a cathode of the first diode coupled with the first fuse terminal of the first circuit branch and the cathode of the second diode coupled with the first fuse terminal of the second circuit branch. In this manner, provision of a single configuration input signal can remove fuses in multiple circuit branches of a plurality of programmable impedance circuits.

In accordance with further aspects of the disclosure, a motor drive is provided, which includes a signal conditioning system having multiple signal inputs and multiple channel circuits, where each channel circuit includes two or more parallel circuit branches including an impedance connected in series with a fuse. The signal conditioning system also includes a plurality of configuration inputs for connection to a configuration signal source, as well as a blocking circuit coupled between the configuration inputs and the channel circuits to facilitate contemporaneous opening of fuses of a given circuit branch of each of the channel circuits using a single configuration input signal. In certain embodiments, the blocking circuit includes multiple diode groups individually corresponding to one of the configuration inputs and to one of the circuit branches. Each diode group includes a plurality of diodes individually corresponding to one of the channel circuits, each including an anode coupled with the corresponding configuration input as well as a cathode coupled with the first fuse terminal of the corresponding circuit branch in the corresponding channel circuit. In other embodiments, the blocking circuit has multiple diode groups, each corresponding with two or more branches of each of the programmable impedance circuits, and each corresponding with one of the configuration inputs. Each diode group in these embodiments includes, for each of the programmable impedance circuits, first and second diodes individually including an anode coupled with the corresponding configuration input as well as a cathode of the first diode coupled with the first fuse terminal of the first circuit branch and the cathode of the second diode coupled with the first fuse terminal of the second circuit branch.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the invention will be set forth in the following detailed description when considered in conjunction with the drawings, in which.

DETAILED DESCRIPTION OF THE INVENTION

Referring now to the figures, several embodiments or implementations of the present invention are hereinafter described in conjunction with the drawings, wherein like reference numerals are used to refer to like elements throughout, and wherein the various features are not necessarily drawn to scale. The present disclosure provides techniques and apparatus for programming variable impedance circuits of a circuit board using a reduced number of configuration inputs and associated manufacturing equipment, thereby facilitating expedited cost-efficient fabrication of programmable impedance circuits, which in turn facilitates use of common feedback signal conditioning boards in the manufacture of motor drives and other power conversion systems. Although illustrated in the context of an exemplary motor drive, the concepts and devices disclosed herein find utility in a variety of systems and applications in which it is desirable to configure or program and impedance of a circuit board, whether resistance, capacitance, inductance and/or combinations thereof.

Figure 1:
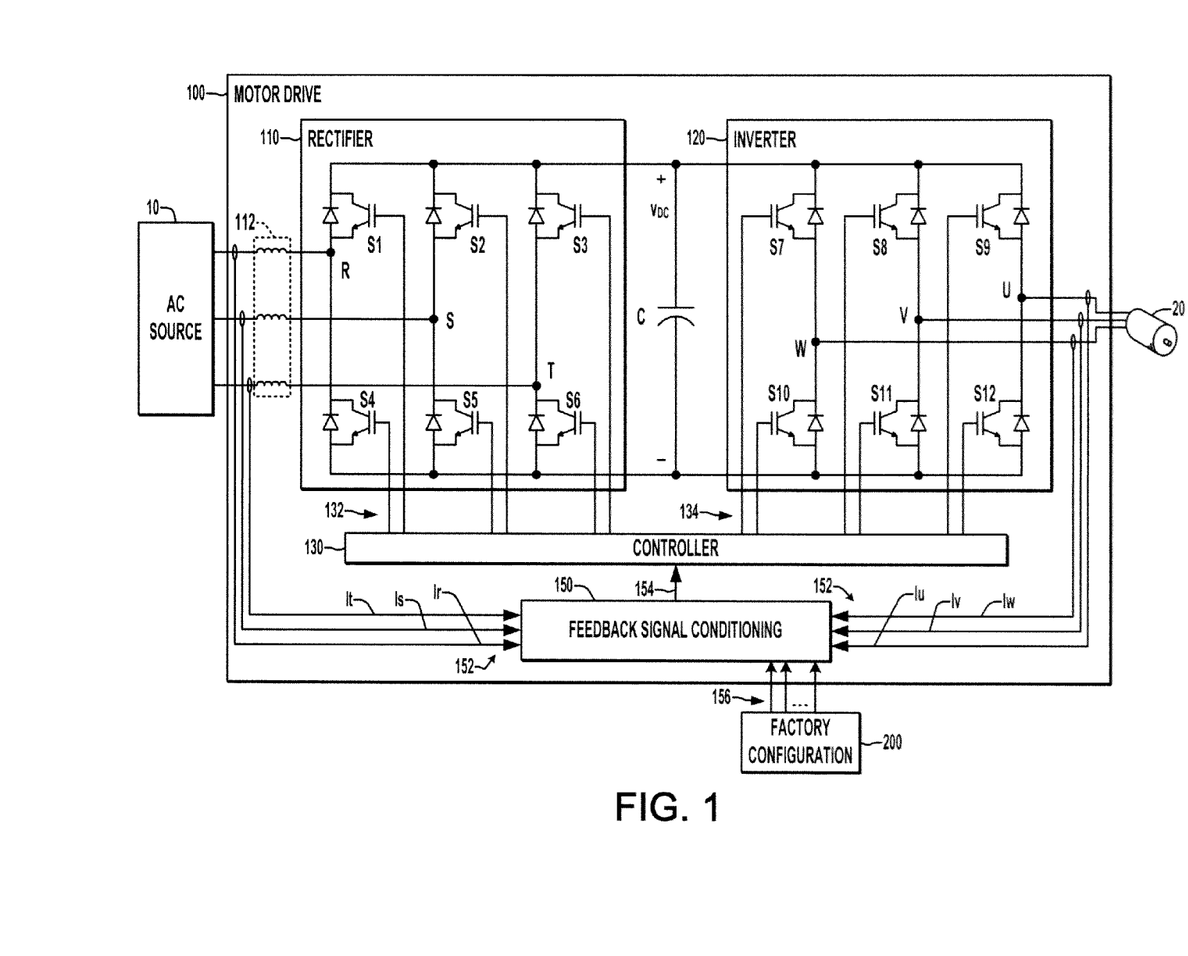
FIG. 1 is a schematic diagram illustrating an exemplary motor drive power conversion system including a programmable feedback signal conditioning system with signal-sharing blocking circuitry in accordance with one or more aspects of the present disclosure.

Referring initially to FIG. 1, an exemplary motor drive 100 is illustrated which includes a rectifier 110 and an inverter 120 coupled with one another by a DC link circuit with a link capacitance C. The rectifier 110 receives single or multiphase AC input power from an AC source 10 and converts the AC input power to intermediate DC which is provided to the link capacitor C. The motor drive 100 may optionally include one or more sources of drive inductive impedance, although not a strict requirement of the present disclosure. For example, an AC reactor 112 may be provided between the AC source 10 and the AC inputs to the rectifier 110 as shown in FIG. 1, and/or a DC link choke (not shown) can be provided in the intermediate DC circuit between the output of the rectifier 110 in the input to the inverter 120. The inverter 120 receives DC input power from the DC link circuit and provides single or multiphase AC output power to drive a motor 20. In the illustrated embodiment, an active three-phase rectifier 110 is provided, having input lines R, S, and T, as well as rectifier switching devices S1-S6 individually coupled between one of the AC input terminals R, S, or T and a corresponding one of two DC link terminals (positive (+) or negative (−)). A motor drive controller 130 provides rectifier switching control signals 132 to operate the rectifier switching devices S1-S6 in accordance with a switching scheme for controlled conversion of AC input power from the source to a regulated DC voltage $V_{DC}$ across the DC link capacitance C. Other embodiments are possible in which a passive rectifier 110 is used, in which case the switching devices S1-S6 can be rectifier diodes.

The inverter 120 receives the DC input power from the link capacitor C, and includes a switching circuit with switching devices S7-S12 operated according to inverter switching control signals 134 provided by the controller 130 for selective conversion of DC input power to single or multiphase AC output power to drive the motor load 20. In the illustrated embodiment, the inverter 120 provides three-phase output power along motor lines U, V, and W, although any single or multiphase output can be used to drive the motor 20. In operation, the controller 130 provides the rectifier and inverter switching control signals 132, 134 according to a control strategy for controlling the speed, position, and/or torque of the motor load 20 according to one or more corresponding setpoints (not shown).

In addition, the operation of the controller 130 is closed loop, wherein the controller 130 modifies the signals 132 and/or 134 in accordance with one or more feedback signals 154 from a feedback signal conditioning system 150. In certain embodiments, the feedback signal conditioning system 150 may be a single printed circuit board with suitable interconnections for providing the feedback signals 154 as any suitable electrical signal(s) and/or message(s) to one or more processors (not shown) of the controller 130. The feedback signal conditioning system 150 in the illustrated embodiment receives one or more input signals or values 152 in the form of electrical signals from AC input and output current sensors/transducers associated with the corresponding input terminals R, S, T and output terminals U, V, W. The sensors in this implementation provide electrical output signals 152 (AC or DC) which may represent the present level, RMS, peak, or other value indicating the operating input and output currents (Ir, Is, It, Iu, Iv and Iw) of the motor drive 100 at any particular time.

Figure 2:
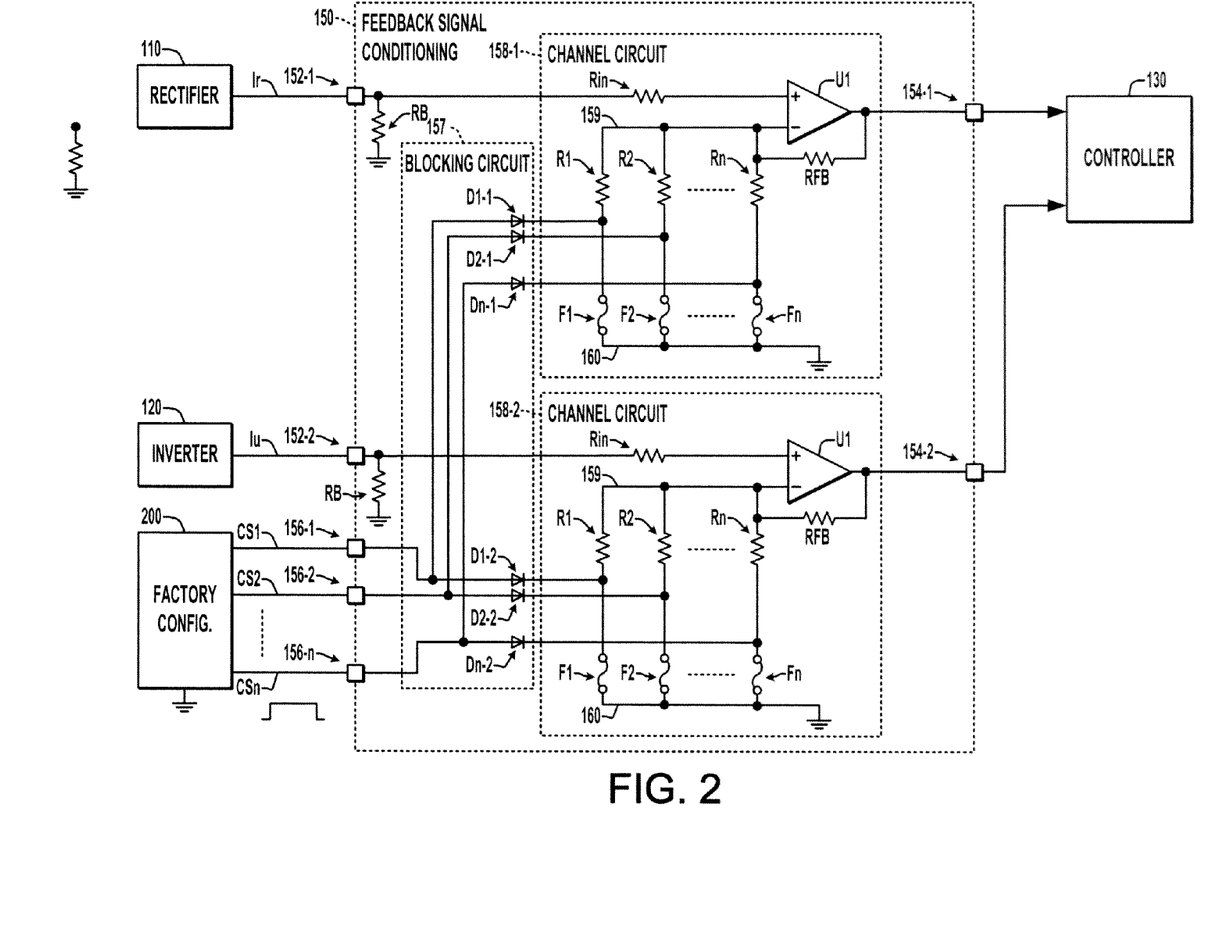
FIG. 2 is a schematic diagram illustrating further details of the exemplary feedback signal conditioning system with configurable resistive feedback circuit impedance in the motor drive of FIG. 1.

Referring also to FIG. 2, these input signals 152 are provided to corresponding channel circuits 158 of the feedback signal conditioning system 150. In FIG. 2, two exemplary channel circuits 158-1 and 158-2 are illustrated, respectively receiving a first input current sensor signal Ir corresponding to the input terminal "R" of the rectifier 110 and a first output current sensor signal Iu corresponding to the output terminal "U" of the inverter 120. In the embodiment of FIG. 1, the feedback signal conditioning system 150 includes six such channel circuits 158-1 through 158-6 such that each of the sensor signals Ir, Is, It, I is u, Iv and Iw is provided to a corresponding channel circuit 158 by way of a corresponding signal input terminal 152-1 through 152-6. Other embodiments are possible in which an integer number "m" channel circuits 158 are provided, where m=6 in the illustrated embodiment, and m can be any integer greater than 1. As seen in FIG. 2, each of the channel circuits 158 includes an amplifier circuit with a op amp U1 having a noninverting input coupled with the corresponding signal input terminal 152 by way of an input resistance Rin. An inverting input of the op amp U1 is coupled with an output of the op amp U1 by a feedback resistor RFB, where the op amp output provides a corresponding signal 154 to the motor drive controller 130.

Although the input impedance Rin and the feedback component RFB are shown as being single resistors, any suitable input and feedback networks can be used, including one or more resistances, capacitances, inductors and/or combinations thereof. In addition, the illustrated embodiments shown in FIGS. 2-5 may further include burden resistances RB coupled from the respective input terminals 152 to a circuit ground, although not a strict requirement of the present disclosure.

In order to establish the channel circuit gain, moreover, the channel circuits 158 each include an integer number "n" parallel circuit branches that extend between a first circuit node 159 (in this case coupled with the inverting input of the op amp U1) and a second circuit node 160 (circuit ground in the illustrated embodiment). Each of these circuit branches includes at least one impedance (a resistor R in each circuit branch of the channel circuits 158 of FIG. 2) as well as a fuse F. For instance, the first parallel circuit branch includes a resistor R1 connected in series with a fuse F1 between the first circuit node 159 at the inverting op amp input and the second circuit node 160 at ground, with the fuse F1 connected between the central node of the circuit branch and ground. Similarly, the second circuit branch includes a resistor R2 connected between the inverting input 159 and a central node, as well as a fuse F2 connected between the central node and the circuit ground 160. The channel circuit 158 includes an integer number n such parallel circuit branches, where n≥2. The values of the impedances R1, R2, . . . Rn can be equal in certain embodiments, or can be different. In either case, selective removal (e.g., "opening" or "blowing") of one or more of the fuses F1, F2, . . . Fn changes the parallel combination and thus the effective resistance between the first and second circuit nodes 159 and 160 of the channel circuits 158. In this embodiment, therefore, opening of one or more of the fuses F1, F2, . . . Fn sets the resistance between the inverting input of the op amp U1 and the circuit ground, and thereby adjusts the gain of the channel circuit 158 in providing the output 154 based on the corresponding received current sensor input 152.

Figure 3:
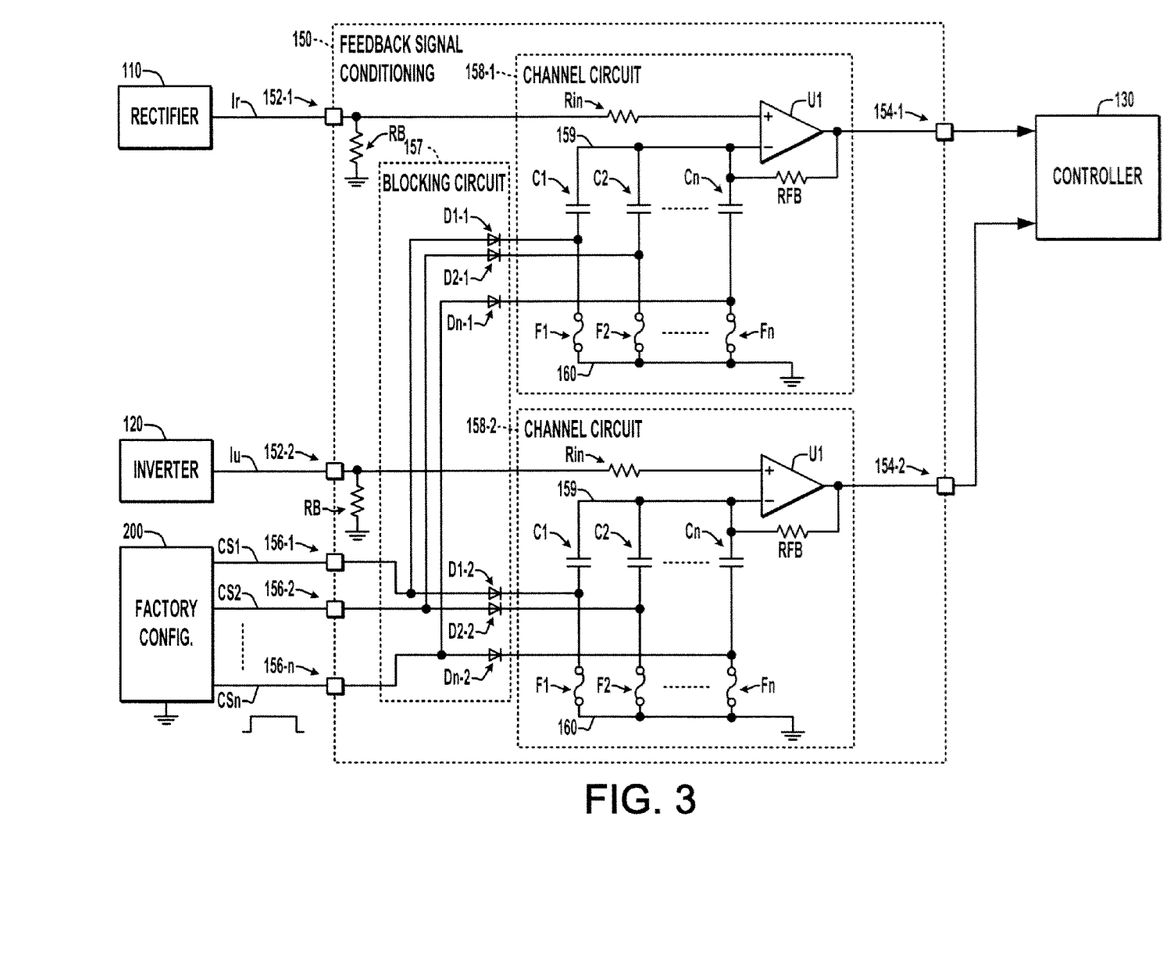
FIG. 3 is a schematic diagram illustrating another signal conditioning system embodiment with programmable capacitive feedback circuit impedance.
Figure 4:
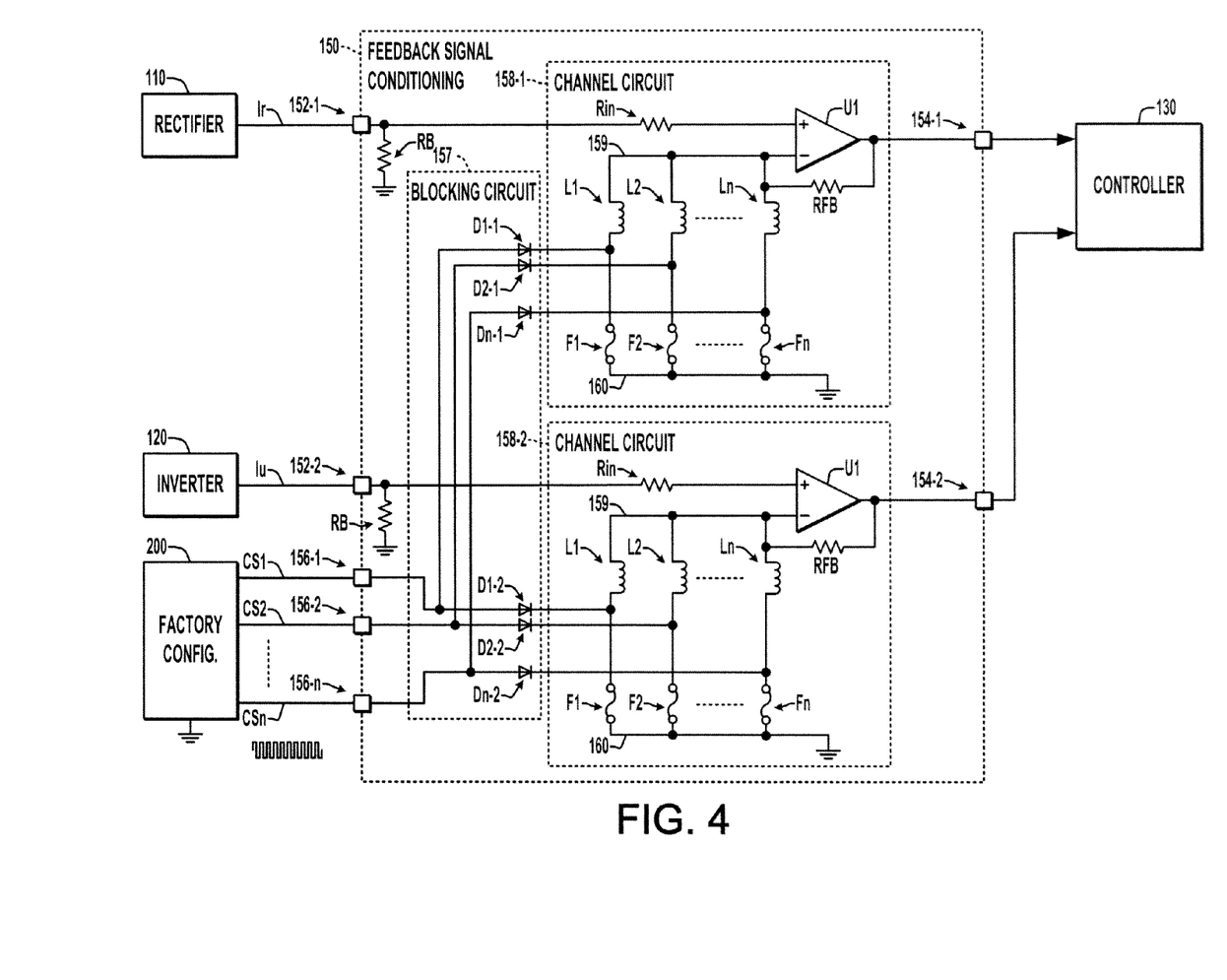
FIG. 4 is a schematic diagram of illustrating yet another signal conditioning system embodiment with programmable inductive feedback circuit impedance.

As further seen in FIGS. 3 and 4, other embodiments may employ capacitances C1, C2, . . . Cn in the circuit branches of the channel circuits 158 (FIG. 3), and still other embodiments may employ inductors L1, L2, . . . Ln in series with the fuses F1, F2, . . . Fn of the circuit branches.

The feedback signal conditioning system 150 further includes an integer number n configuration inputs 156 which may be connected (e.g., during manufacturing) to a factory configuration signal source 200 which selectively provides corresponding configuration input signals CS. In the example of FIG. 2, the signal source 200 selectively provides a positive pulse signal CS on one or more of the configuration inputs 156-1 through 156-n, which can be any suitable voltage pulse signal having sufficient amplitude and duration to open the corresponding fuses F in order to set the channel circuit gains. The signal source 200, moreover, can provide pulse signals CS to more than one of the configuration inputs 156, or to just a single one of the inputs 156, and may provide multiple pulse signals CS to multiple configuration inputs 156 concurrently, or such may be provided at different times. In the embodiment of FIG. 3, the signal source 200 likewise provides the configuration input signal(s) CS as a positive pulse. Where an inductance is used, as seen in FIG. 4, the signal source 200 instead provides a high frequency pulse signal of sufficient frequency and amplitude to open the corresponding fuses F of a given circuit branch in each of the channel circuits 158, with the high frequency signal being effectively blocked by the inductors L.

As seen in FIGS. 2-4, a blocking circuit 157 is provided in the feedback signal conditioning system 150 between the configuration inputs 156 and the channel circuits 158 in order to economize the number of configuration inputs 156 needed to program the fuses F of the channel circuits 158 during initial manufacturing, while allowing independent operation of the channel circuits 158 during normal motor drive operation. In operation, any suitable blocking circuit 157 may be used which facilitates contemporaneous opening of fuses F of a given circuit branch of each of the channel circuits 158-1 through 158-m using a single configuration input signal CS from a connected configuration signal source 200 (e.g., when the motor drive 100 is not being operated), and which prevents or mitigates electrical interaction between the channel circuits 158 when the motor drive 100 is being operated (e.g., when the configuration signal source 200 is disconnected from the feedback signal conditioning system 150).

In the embodiments of FIG. 2-4, for instance, the blocking circuit 157 includes a plurality of diodes D formed into multiple diode groups individually corresponding to one of the configuration inputs 152 and to one of the circuit branches. Each such group of diodes in this example includes an integer number "m" diodes that individually correspond to one of the channel circuits 158-1 to 158-m. In the example of FIGS. 2-4, a first such group includes diodes D1-1, D1-2, . . . D1-m, where m=6, and a second such group includes diodes D2-1, D2-2, . . . D2-m, where the blocking circuit 157 includes an integer number "n" such groups, with the last including diodes Dn-1, Dn-2, . . . Dn-m. Each of the diodes of a given one of these groups, moreover, including an anode coupled with the corresponding configuration input 156 as well as a cathode coupled with the first fuse terminal of the corresponding circuit branch in the corresponding channel circuit 158. For example, in the first diode group shown in FIG. 2, all the anodes of the diodes D1-1, D1-2, . . . D1-m are connected to the first configuration input 156-1, and the cathodes are each connected to the upper terminal of the corresponding fuse F1 in the associated channel circuit 158-1, 158-2, . . . 158-m. In particular, the cathode of D1-1 is connected to the upper terminal of fuse F1 in the first channel circuit 158-1, the cathode of D1-2 is connected to the fuse F1 in the second channel circuit 158-2, etc.

Figure 5:
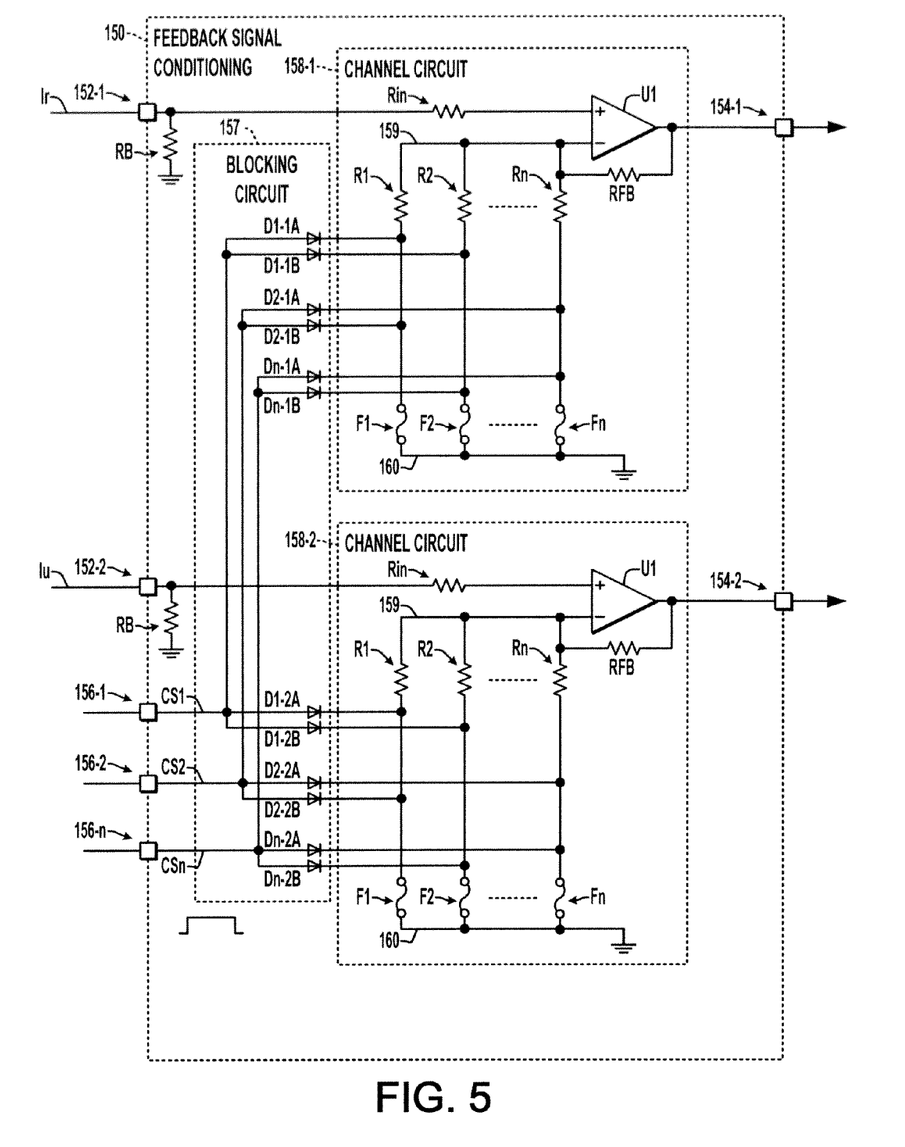
FIG. 5 is a schematic diagram illustrating yet another signal conditioning system embodiment in which individual configuration signals are used to concurrently open fuses in multiple parallel circuit branches of each channel circuit.

Referring to FIG. 5, in other embodiments, the blocking circuit 157 has multiple diode groups, but each of these corresponds with two or more branches of each of the channel circuits 158, and each diode group corresponds with one of the configuration inputs 152. In this manner, provision of a single configuration input signal CS can remove fuses in multiple circuit branches of the channel circuits 158, thereby further economizing on the number of configuration inputs 152 required to program a given feedback signal conditioning system 150. For each channel circuit 158, each of the diode groups in FIG. 5 includes a pair of diodes, each having an anode connected to the corresponding configuration input 152, where the cathode of the first diode is connected to fuse of the first circuit branch and the cathode of the second diode is connected to the fuse of the other circuit branch. In the embodiment shown in FIG. 5, for instance, the first group includes diodes D1-1A, D1-1B, D1-2A and D1-2B, each having an anode connected to the first configuration signal input 156-1. The cathode of D1-1A is connected to the first fuse F1 in the first channel circuit 158-1 and the diode D1-1B has its cathode connected to the second fuse F2 of the channel circuit 158-1. The cathode of D1-2A is connected to the first fuse F1 of the second channel circuit 158-2, and the cathode of D1-2B is connected to the second fuse F2 of the second channel circuit 158-2.

Further embodiments are possible in which some diode groups correspond with a single circuit branch of each of the channel circuits 158, while other diode groups correspond with two or more circuit branches of each of the channel circuits 158. Such embodiments (not shown) further facilitate speed of programming, particularly where a relatively large number of parallel circuit branches are provided in each of the channel circuits 158 to facilitate high resolution programmatic impedance adjustment.

Figure 6:
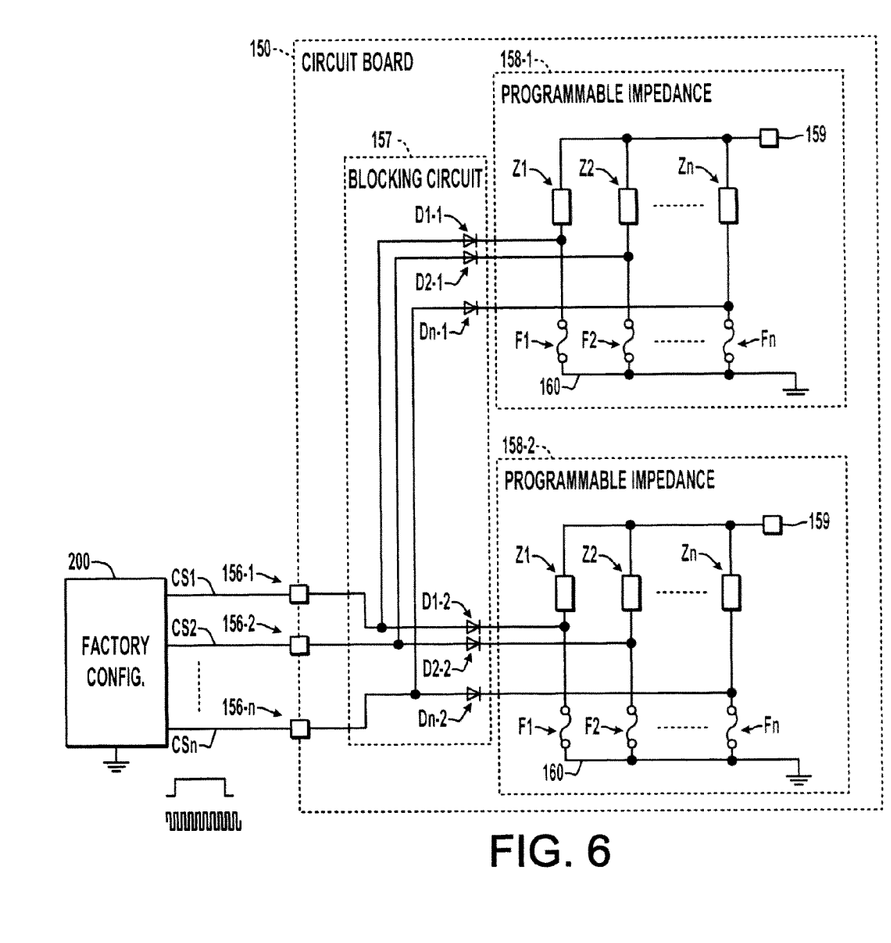
FIG. 6 is a schematic diagram illustrating a circuit board with multiple programmable impedance circuits coupled with a factory configuration programming system via an on-board blocking circuit in accordance with further aspects of the present disclosure.

Referring now to FIG. 6, a configurable circuit board 150 is illustrated, including programmable impedance circuits 158 individually including multiple parallel circuit branches extending between a first circuit node 159 and a second circuit node 160. Each circuit branch of the programmable impedance circuits 158 includes one or more impedances (e.g., single or multiple resistance, capacitance, inductance or combinations thereof) coupled in series with at least one fuse F between the nodes 159 and 160. The board 150 also provides an integer number n configuration inputs 156-1, 156-2, . . . 156-n to receive corresponding configuration input signals CS1, CS2, . . . CSn from a factory configuration signal source 200. A blocking circuit 157 is coupled between the configuration inputs 156 and the programmable impedance circuits 158 to facilitate contemporaneous opening of fuses F of a given circuit branch of each of the programmable impedance circuits 158 using a single configuration input signal CS from a connected signal source 200. In addition, the blocking circuit 157 prevents electrical interaction between the programmable impedance circuits 158 when no signal source 200 is connected to the circuit board 150.

The embodiment of FIG. 6 illustrates use of the blocking circuitry 157 and a general application of adjusting the impedance between circuit nodes 159 and 160 by selective opening of one or more fuses F1, F2, . . . Fn, where the blocking circuit 157 allows such programmatic impedance adjustment of multiple programmable impedance circuits 158 using a small number of factory configuration signals CS. In this example, the blocking circuit 157 includes n diode groups, each corresponding to one of the n configuration inputs 156 and to one of the n circuit branches of the impedance circuits 158. Each diode group, moreover, includes an integer number m diodes (e.g., m=2 in the illustrated example) which individually correspond to one of the m programmable impedance circuits 158. For instance, a first group includes diodes D1-1 and D1-2, with the anodes of both diodes coupled with the first configuration signal input 156-1, and with the cathode of D1-1 connected to the first fuse F1 of the programmable impedance circuit 158-1 and the cathode of D1-2 connected to the first fuse F1 of the second programmable impedance circuit 158-2. In this manner, the single signal C51 can open the first fuses F1 of both the programmable impedance circuits 158-1 and 158-2, and thereafter in operation, the diodes D1-1 and D1-2 prevent electrical interaction between the programmable impedance circuits 158-1 and 158-2. In other embodiments, the blocking circuit 157 may allow contemporaneous opening of fuses F of more than one circuit branch of each of the programmable impedance circuits 158 using a single configuration input signal CS, for example, by employing diode groups such as those illustrated and described above in connection with FIG. 5.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A motor drive, comprising:
an input for receiving input electrical power;
an output for providing output electrical power to drive a motor load (20);
at least one power converter stage operative to convert electrical power from a first form to a second form; and
a signal conditioning system, comprising:
an integer number m signal inputs individually receiving an input signal representative of a sensed operating condition of the motor drive, m being greater than 1,
an integer number m channel circuits providing signal conditioning for a corresponding one of the plurality of signal inputs, the individual channel circuits including an integer number n parallel circuit branches extending between a first circuit node and a second circuit node, n being greater than 1, each circuit branch comprising:
at least one impedance comprising a first impedance terminal coupled with the first circuit node and a second impedance terminal, and
at least one fuse having a first fuse terminal coupled with the second impedance terminal, and a second fuse terminal coupled with the second circuit node, and
an integer number n configuration inputs individually coupleable to a configuration signal source to receive a corresponding configuration input signal, and
a blocking circuit coupled between the configuration inputs and the channel circuits to facilitate contemporaneous opening of fuses of a given circuit branch of each of the channel circuits using a single configuration input signal when the motor drive is not being operated, and to prevent electrical interaction between the channel circuits when the motor drive is being operated.

2. The motor drive of claim 1, wherein the blocking circuit comprises an integer number n diode groups, each diode group corresponding to one of the n configuration inputs and to one of the n circuit branches, each diode group including an integer number m diodes individually corresponding to one of the m channel circuits and individually including an anode coupled with the corresponding configuration input, and a cathode coupled with the first fuse terminal of the corresponding circuit branch in the corresponding channel circuit.

3. The motor drive of claim 2, wherein the at least one impedance of each circuit branch comprises at least one resistance.

4. The motor drive of claim 2, wherein the at least one impedance of each circuit branch comprises at least one capacitance.

5. The motor drive of claim 2, wherein the at least one impedance of each circuit branch comprises at least one inductance.

6. The motor drive of claim 1, wherein the blocking circuit allows contemporaneous opening of fuses of a plurality of circuit branches of each of the channel circuits using a single configuration input signal when the motor drive is not being operated.

7. The motor drive of claim 6, wherein the blocking circuit comprises an integer number n diode groups, wherein each diode group corresponds with first and second circuit branches of each of the channel circuits and with one of the configuration inputs, and includes for each of the channel circuits first and second diodes individually including an anode coupled with the corresponding configuration input, with a cathode of the first diode coupled with the first fuse terminal of the first circuit branch, and with a cathode of the second diode coupled with the first fuse terminal of the second circuit branch.

8. The motor drive of claim 6, wherein the at least one impedance of each circuit branch comprises at least one resistance.

9. The motor drive of claim 6, wherein the at least one impedance of each circuit branch comprises at least one capacitance.

10. The motor drive of claim 6, wherein the at least one impedance of each circuit branch comprises at least one inductance.

11. The motor drive of claim 1, wherein the at least one impedance of each circuit branch comprises at least one resistance.

12. The motor drive of claim 1, wherein the at least one impedance of each circuit branch comprises at least one capacitance.

13. The motor drive of claim 1, wherein the at least one impedance of each circuit branch comprises at least one inductance.

14. A configurable circuit board, comprising:
an integer number m programmable impedance circuits individually including an integer number n parallel circuit branches extending between a first circuit node and a second circuit node, m and n each being greater than 1, each circuit branch comprising:
at least one impedance comprising a first impedance terminal coupled with the first circuit node and a second impedance terminal, and
at least one fuse having a first fuse terminal coupled with the second impedance terminal, and a second fuse terminal coupled with the second circuit node, and
an integer number n configuration inputs individually coupleable to a configuration signal source to receive a corresponding configuration input signal, and
a blocking circuit coupled between the configuration inputs and the programmable impedance circuits to facilitate contemporaneous opening of fuses of a given circuit branch of each of the programmable impedance circuits using a single configuration input signal when the configuration signal source is connected to the configurable circuit board, and to prevent electrical interaction between the programmable impedance circuits when the configuration signal source is disconnected from the configurable circuit board.

15. The configurable circuit board of claim 14, wherein the blocking circuit comprises an integer number n diode groups, each diode group corresponding to one of the n configuration inputs and to one of the n circuit branches, each diode group including an integer number m diodes individually corresponding to one of the m programmable impedance circuits and individually including an anode coupled with the corresponding configuration input, and a cathode coupled with the first fuse terminal of the corresponding circuit branch in the corresponding programmable impedance circuit.

16. The configurable circuit board of claim 14, wherein the blocking circuit allows contemporaneous opening of fuses of a plurality of circuit branches of each of the programmable impedance circuits using a single configuration input signal when the configuration signal source is connected to the configurable circuit board.

17. The configurable circuit board of claim 16, wherein the blocking circuit comprises an integer number n diode groups, wherein each diode group corresponds with first and second circuit branches of each of the programmable impedance circuits and with one of the configuration inputs, and includes for each of the programmable impedance circuits first and second diodes individually including an anode coupled with the corresponding configuration input, with a cathode of the first diode coupled with the first fuse terminal of the first circuit branch, and with a cathode of the second diode coupled with the first fuse terminal of the second circuit branch.

18. The configurable circuit board of claim 14, wherein the at least one impedance of each circuit branch comprises at least one resistance.

19. The configurable circuit board of claim 14, wherein the at least one impedance of each circuit branch comprises at least one capacitance.

20. The configurable circuit board of claim 14, wherein the at least one impedance of each circuit branch comprises at least one inductance.

* * * * *